United States Patent
Hasegawa et al.

(10) Patent No.: US 8,075,233 B2
(45) Date of Patent: Dec. 13, 2011

(54) BOLT, THE AXIAL FORCE OF WHICH IS TO BE DETERMINED BY A SUPERSONIC WAVE, AND A METHOD FOR THE MANUFACTURING THEREOF

(75) Inventors: Saburo Hasegawa, Aichi (JP); Kimihiko Asao, Aichi (JP); Koji Makino, Aichi (JP); Takashi Kato, Aichi (JP); Hideo Negishi, Hino (JP)

(73) Assignees: Meidoh Co., Ltd., Aichi (JP); Hino Motors, Ltd., Tokyo (JP)

( * ) Notice: Subject to any disclaimer, the term of this patent is extended or adjusted under 35 U.S.C. 154(b) by 548 days.

(21) Appl. No.: 12/218,537

(22) Filed: Jul. 15, 2008

(65) Prior Publication Data
US 2010/0014940 A1    Jan. 21, 2010

(51) Int. Cl.
*F16B 31/02*    (2006.01)
(52) U.S. Cl. ............................. 411/8; 411/14; 73/761
(58) Field of Classification Search ............. 411/8, 13, 411/14, 402, 403; 73/761
See application file for complete search history.

(56) References Cited

U.S. PATENT DOCUMENTS

| | | | | |
|---|---|---|---|---|
| 3,329,057 A * | 7/1967 | Salz | | 411/366.1 |
| 3,718,066 A * | 2/1973 | Dally | | 411/14 |
| 4,506,917 A * | 3/1985 | Hansen | | 285/4 |
| 5,029,480 A * | 7/1991 | Kibblewhite | | 73/761 |
| 5,220,839 A * | 6/1993 | Kibblewhite | | 73/761 |
| 5,913,650 A * | 6/1999 | Daoud | | 411/410 |
| 6,009,759 A * | 1/2000 | Kibblewhite et al. | | 73/761 |
| 6,712,570 B2 * | 3/2004 | Kersten | | 411/8 |

FOREIGN PATENT DOCUMENTS

| | | |
|---|---|---|
| JP | 2002-113546 A | 4/2002 |
| JP | 2002-316235 A | 10/2002 |
| JP | 2007-301663 A | 11/2007 |

* cited by examiner

*Primary Examiner* — Flemming Saether
(74) *Attorney, Agent, or Firm* — Cooper & Dunham LLP

(57) ABSTRACT

The object of the present invention is to provide a bolt, the axial force of which can be measured by a supersonic wave, or the like, with high accuracy and which can be manufactured in a shortened process.
A bolt 1 having an angular polygonal shaped bolt head 2 is provided in the present invention. A recess 4 is formed on the bolt head 2 and a projection 5 having a plane upper face 6 is formed on the inner side of the recess 4, and at the end of the bolt shaft 3, a plane end face 8 is formed, and a wall, the outside of which being a C-face part is formed around the plane end face 8.

2 Claims, 5 Drawing Sheets

BOLT, THE AXIAL FORCE OF WHICH IS TO BE DETERMINED BY A SUPERSONIC WAVE, AND A METHOD FOR THE MANUFACTURING THEREOF

FIELD OF THE INVENTION

The present invention relates to a bolt, the axial force of which is to be determined by a supersonic wave, and the like, and a method for the manufacturing thereof.

BACKGROUND OF THE INVENTION

When a bolt is screwed and clamped into a female screw by such as an impact wrench and the like, the clamping torque is generally determined so that when said clamping torque reaches to a prescribed value, the clamping of said bolt is set to be completed.

To determine said clamping torque, generally a method is employed, using a bolt having flat plane faces at the upper end of the bolt head and at the end of the bolt shaft, and making the supersonic wave sending and receiving probe of an axial force detector come into contact with the flat plane face of the upper end of said bolt head, to send the supersonic wave generated in said axial force detector into the bolt through said supersonic wave sending and receiving probe from the upper end of the bolt head, so as to reflect said supersonic wave onto said flat plane face at the end of the bolt shaft, then receiving said reflected supersonic wave with said supersonic wave sending and receiving probe to measure the time elapsed from the input of said supersonic wave to the receiving of the reflected supersonic wave, with the axial force of the bolt being calculated based on said elapsed time.

To measure said axial force correctly, the flatness and perpendicular degree of both said flat plane faces of the upper end of said bolt head and the end of said bolt shaft should be as accurate as possible, and the surface roughness of both said flat plane faces of the upper end of said bolt head and the end of said bolt shaft should be minimal.

On the other hand, a polygonal (generally hexagonal) shaped outline is given to the bolt head so that the bolt can be clamped effectively into the female screw with the bolt clamping machine, it being desirable that said polygonal shaped outline of said bolt head be angular enough.

Hitherto, a recess is formed on the bolt head to give an angular polygonal shaped outline to said bolt head.

More particularly, in general, to form the bolt head having polygonal shaped outline, cold forging of the columnar bolt material in a forging mold has been applied, and in said cold forging process, a bolt head forging mold having a projecting mold part to form the recess on the upper face of the bolt head is used, and when the recess on the upper face of the bolt head is formed by said bolt head forging mold's projecting mold part, the material of said bolt head flows radially giving an angular polygonal shaped outline to said bolt head. Further, the end part of the bolt shaft has a tapered shape, so as to reduce gradually the diameter of the end part toward the end of the bolt shaft so as to guide easily the bolt into the female screw. Said tapered end part of the bolt shaft is called the C-face part.

| Patent Literature 1 | Patent Publication JP2007-301663 |
| Patent Literature 2 | Patent Publication JP2002-316235 |
| Patent Literature 3 | Patent Publication JP2002-113546 |

As described above, to give an angular polygonal shaped outline to said bolt, a recess is formed on the bolt head by the cold forging (see Patent Literature 1), a plane face being formed on the bottom of said recess to measure the axial force by a supersonic wave and the like, with the supersonic wave sending and receiving probe of said axial force detector being attached to said plane face of said recess.

Nevertheless, in a case where the diameter of said probe is larger than that of said recess, said probe can not be put into said recess so that the size of said probe is limited by the size of said recess.

Further, to form a wall around said plane end face of said bolt shaft, a die having a penetrating hole into which the shaft part of the bolt material is to be inserted is used, the diameter of the end part of said penetrating hole being set to gradually reduce so as to become a forming part of the outside of said wall (C-face forming part).

Using said die, the shaft part of the bolt material is inserted into the penetrating hole of said die, and punching is performed on said bolt material to form the tapered end part, the outer diameter of which reduces gradually toward the end of said shaft part of the bolt material. At the same time, a projecting end face is formed at the end of said tapered end part. When said projecting end face is pressed strongly with the correcting tool, said projecting end face is corrected to be a plane face (see Patent Literature 2).

In this traditional method, the multi-stage process consisting of forming said tapered end part (C-face part) by the cold forging, forming said plane projecting end face, and forming a spiral thread around said shaft part is necessary.

The method in which said tapered end part (C-face part) and said plane end face are formed simultaneously has been provided, said method using a die having a penetrating hole, the diameter of the end part of which is reduced gradually to be a C-face forming part, the bolt material being inserted into said penetrating hole, following which punching is performed on said bolt material to form the C-face part at the end of the shaft part of said bolt material, and at the same time, punching is further performed on the end of the shaft part of said bolt material to form a recess having a plane bottom face (see Patent Literature 3).

In said method, in which said tapered end part and said plane end face are formed at the same time, said plane end face has a small area, since said plane end face is formed in the center of the end of the shaft part of said bolt material, making it difficult to measure correctly axial force.

SUMMARY OF THE INVENTION

An object of the present invention is to provide a bolt, the axial force of which can be measured without the size limitations of the supersonic wave sending and receiving probe of the axial force detector, to solve the above described problems.

Another object of the present invention is to form said C-face part and said plane face part at the end part of the bolt shaft part by a shortened process. To attain the above described objects, the present invention provides a bolt, the axial force of which is to be determined by a supersonic wave, consisting of a bolt head having a polygonal shaped outline, and a bolt shaft around which a spiral thread is formed, wherein a recess having a polygonal shaped outline corresponding to the polygonal shaped outline of said bolt head is formed on said bolt head, with each corner of the polygonal shaped outline of said recess and each corresponding corner of the polygonal shaped outline of said bolt head being on a radial line from the center of said recess, with a projection having a plane upper face being formed on the inner side of said recess, said plane upper face being set to be on the same level as, or a little higher level than, the upper face of said bolt head, said bolt shaft having a plane end face, said plane end face being surrounded with a wall, the outer diameter of which is set to reduce gradually toward the end of said bolt shaft, said wall being formed by stretching the spiral thread forming part of said bolt shaft.

It is desirable that the diameter of the plane upper face of said projection formed on the inner side of said recess is set to be in the range of between 1/5 and 4/5 of the distance between one and the other side parts of the polygonal shaped outline of said recess in opposition to each other, with the outside face of said wall of said bolt shaft end being set to incline at an angle α in the range of between 30 and 70 degrees.

Further, the present invention provides a method comprising:

a preliminary forging process comprising setting a columnar bolt material into the cylindrical cavity of the die of a cold forging machine in such a way that the bolt head forming part of said bolt material protrudes from said cylindrical cavity of said die, and punching said bolt head forming part of said bolt material with a punch used for the preliminary forging to radially expand said bolt head forming part and form a green bolt head having a plane upper face, and at the same time, forming a preliminary plane end face at the end of the bolt shaft forming part of said bolt material, a main forging process comprising punching a punch used for the main forging on said green bolt head, said punch preparing a cavity having a polygonal shape corresponding to the polygonal shaped outline of an objective bolt head, and a bolt head upper face forming part to form a recess and a projection at the back side of said cavity, forming a bolt head having a polygonal shaped outline, a recess having a polygonal shaped outline corresponding to the polygonal shaped outline of said bolt head and a projection having a plane upper face, said plane upper face originating from the plane upper face of said green bolt head, and as a result, forging a green bolt having a bolt head and a green bolt shaft, and a rolling process comprising rolling said green bolt to form a spiral thread around the green bolt shaft of said green bolt using a rolling die having a thread forming part, and a wall forming part, then stretching and projecting the thread forming part of said green bolt shaft from said plane end face of said bolt shaft, to form a wall around said plane end face, the outer diameter of said wall being set to reduce gradually toward the end of said bolt shaft.

Said bolt 1 of the present invention has a recess having a polygonal shaped outline corresponding to that of said bolt head 2 so that when said bolt head 2 is formed by the cold forging, the material corresponding to the volume of said recess radially flows toward the outside, resulting in the corners of said bolt head being adequately angular. In the present invention, since each corner 4C of the polygonal outline of said recess 4 and each corresponding corner 2C of the polygonal outline of said bolt head 2 are on a radial line from the center of said recess, said bolt head is effectively given an angular shape.

Further, in said bolt 1 of the present invention, a projection 5, having a plane upper face 6, being formed on the inner part of said recess 4, and said recess 4 on the inner part of which said projection 5, having a plane upper face 6, being formed, are formed in one process by employing punching. Since said plane upper face 6 of said projection 5 is set to be on the same level as, or a little higher level than, the upper face F of said bolt head 2, when the probe of the axial force detector comes into contact with the plane upper face 6 of said projection 5 to measure the axial force of the bolt 1, by an ultrasonic wave and the like, even if the size of the diameter of said probe is larger than that of said recess 4, said probe can come into contact with the plane upper face 6 of said projection 5 without interference from the wall around said recess 4.

Still further, a plane end face 8 is formed at the end of said bolt shaft 3 to reflect the supersonic wave from said bolt head 2 and a wall 9, the outside face of which forms the C-face part is formed to insert said bolt 1 easily into the female screw. To insert said bolt 1 easily into the female screw, the C-face part of said wall 9 is desirably set to incline at an angle α for the bolt shaft axis AX in the range of between 30 and 70 degrees.

Said bolt 1 is manufactured by a method consisting of a preliminary forging process, a main forging process, and a rolling process. In said preliminary forging process and main forging process, said green bolt IC having a plane end face 8 at the end of said green bolt shaft 3A is formed, and then a spiral thread is formed around said green bolt shaft 3A by the rolling process, using a pair of rolling die 19A and 19B, and said wall 9 the outside face of which is the C-face part 9 is formed simultaneously by stretching and projecting the thread forming part of said green bolt shaft 3A from the outside of said plane end part in said rolling process.

As aforementioned, since said rolling process is effected on the outside part of said green bolt shaft, and the thickness of the outside part of said green bolt shaft is set to be substantially the same as that of said thread forming part which is on the outside of said green bolt shaft 3A, said plane end face part 8 at the end of said green bolt shaft 3A maintains a maximum area after the rolling process in which said wall, the outside of which is said C-face part, is formed around said plane end face 8.

As described above, a spiral thread 7 and an outside wall face being C-face part 9 are formed by the rolling process alone.

Accordingly, in the bolt of the present invention, the bolt head has a correct and angular polygonal shaped outline, and the axial force of the bolt is correctly measured.

BRIEF DESCRIPTION OF THE DRAWINGS

FIG. 1 is a front view of a bolt relating to the present invention.

FIG. 2 is a top view of a bolt relating to the present invention.

FIG. 3 is a sectional view cutting along line A-A in FIG. 2.

FIG. 4 is a front sectional view illustrating the setting stage of the bolt material in the preliminary forging process of manufacturing said bolt of the present invention.

FIG. 5 is a front sectional view illustrating the punching stage in the preliminary forging process of manufacturing said bolt of the present invention.

FIG. 6 is a front sectional view illustrating the main forging process of manufacturing said bolt of the present invention.

FIG. 7 is a side sectional view illustrating the rolling process of manufacturing said bolt of the present invention.

FIG. 8 is a front sectional view illustrating the rolling process of manufacturing said bolt of the present invention.

FIG. 9 is a sectional view illustrating how to form the wall, the outside of which is a C-face part.

DETAILED DESCRIPTION

The present invention is illustrated by an embodiment shown in FIGS. 1 to 9. The bolt shown in FIG. 1 has a bolt head 2 the outline of which is polygonal (hexagonal) shaped, a bolt shaft 3 which extends from said bolt head 2, and a recess 4 which is formed on the upper face of said bolt head 2.

Figure 1:
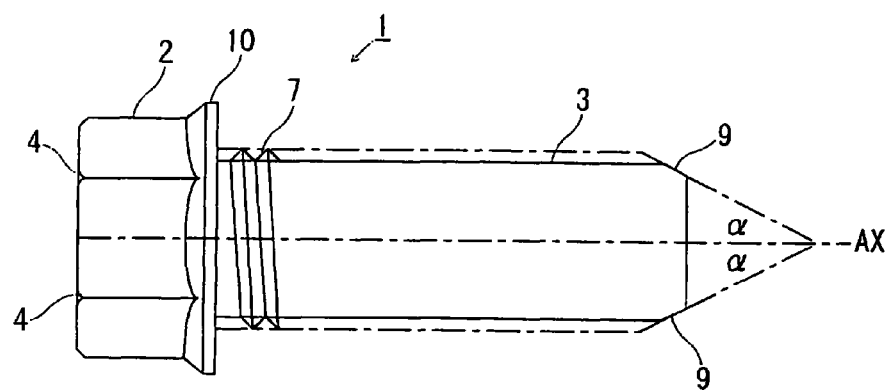
FIGS. 1 to 9 show an embodiment of the present invention.
Figure 2:
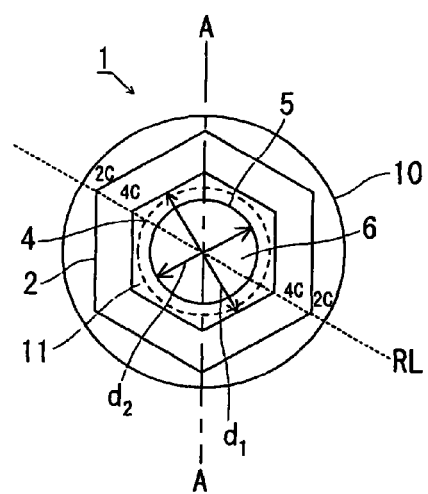
Figure 3:
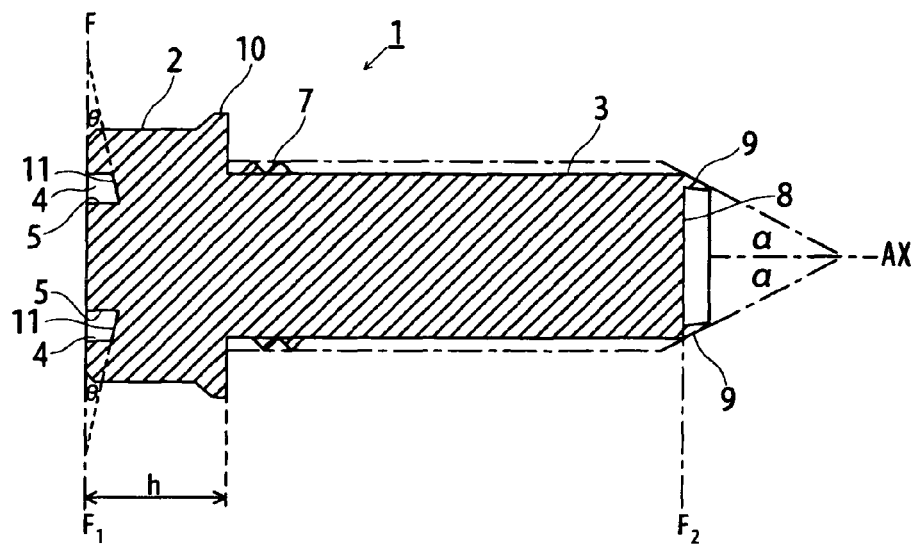

As shown in FIG. 2, said recess 4 has a polygonal shaped outline corresponding to that of said bolt head 2, each corner of said polygonal shaped outline of said recess 4 and each corresponding corner of said polygonal shaped outline of said bolt head 2 are on a radial line RL from the center of said recess 4.

A projection 5 having a plane upper face 6 is formed on the inner part of said recess 4. In this embodiment, said plane upper face 6 of said projection 5 is set to be circular, however, said upper face 6 of said projection 5 may also be set to be a polygonal shape, corresponding to that of the outline of said recess 4.

As shown in 3 a spiral thread 7 is formed around the bolt shaft 3 of said bolt 1, and at the end of said bolt shaft 3, a plane end face 8 is formed, with a wall 9 being formed around said plane end face 8. The outside diameter of said wall 9 is set to reduce gradually toward the end of said bolt shaft 3 giving the outside face of said wall 9 a tapered shape. Said outside face of said wall 9 having a tapered shape is called the C-face part.

A flange part 10 lapping from said bolt head 2 is formed at the root end of said bolt head 2.

To insert easily said bolt 1 into the female screw and to secure the strength of said wall 9, said C-face part of said wall 9 is desirably set to incline at an angle α for the axis AX of said shaft in the range of between 30 and 70 degrees.

In said bolt 1, to secure a high accuracy of axial force measurement, it is desirable that the diameter $d_2$ of the plane upper face 6 of said projection 5 formed on the inner side of said recess 4 be set to be in the range of between 1/5 and 4/5 of the distance $d_1$ between one side and the other side of the polygonal shaped outline of said recess 4 in opposition to each other.

Further, the bottom 11 of said recess 4 between the inside perimeter of said recess 4 and the outside perimeter of said projection 5 is desirably set to incline at an angle θ for the upper face F of said bolt head 2, in the range of between +30 and −30 degrees. Further, the maximum depth d max of said recess 4 is desirably set to be less than 1/2 of the height h of said bolt head 2 (including said flange 10), but more desirably in the range of between about 1/6 and 1/10 of the height h of said bolt head 2.

As a more preferred embodiment, said bottom 11 of said recess 4 is set to incline so that the outside perimeter of said bottom 11 is shallow and the inside perimeter of said bottom 11 is deep, with said recess 4 being set to incline at an angle θ for the upper face F of said bolt head 2 in the range of between +1 and 2 degrees (+1≦θ≦+2 degrees) and with d max being set to be 1/8 h. In this embodiment, the reflective noise of the supersonic wave during axial force measurement may reduce, and as described below, a good angular polygonal shaped bolt head 2 is formed by the cold forging process, because said material can flow smoothly toward the outside perimeter of said bolt head 2 during said cold forging process of said bolt head 2.

Still further, in the present invention, said plane upper face 6 of said projection 5 is set to be on the same level as, or a little higher level than the upper face F of said bolt head 2, so that even if the size of the probe is greater than that of the diameter of said recess 4, said probe can come into contact with the plane upper face 6 of said projection 5 without interference from the wall around said recess 4.

It is also desirable to set the degree of the parallel between the plane upper face 6 ($F_1$) of said projection 5 in said recess 4 of said bolt head 2, and the plane end face 8 ($F_2$) at the end of said bolt shaft 3 to be below 0.1 mm, and to set the average roughness of both plane faces 6 and 8 to be below 12.5.

A method for manufacturing said bolt 1 is described below.
Process 1 (Preliminary Forging Process).

Figure 4:
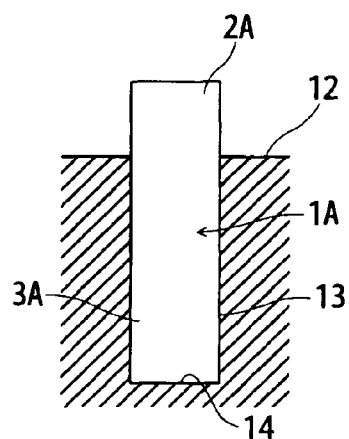
Figure 5:
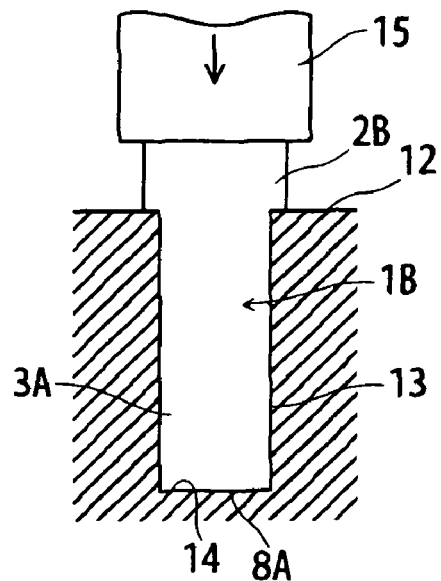

In Process 1, as shown in FIG. 4, a columnar bolt material 1A is first set into the cylindrical cavity 13 of the die 12 of a cold forging machine. The bottom of said cylindrical cavity 13 is a plane face which is to be a molding part of said plane end face 8 of said bolt shaft 3 (plane face molding part 14). After said bolt material 1A is set into the cavity 13 of said die 12, the bolt head forming part 2A at the upper end part of said bolt material 1A which protrudes from said cavity 13 is punched from the upper side with a punch 15 which is used for the preliminary forging to form a preliminary forged body 1B as shown in FIG. 5. In said preliminary forging, said bolt forming part radially expands to be a green bolt head 2B, and at the same time a preliminary plane end face 8A is formed at the end of said bolt shaft forming part 3A of said bolt material 1A.

Process 2 (Main Forging Process)

Figure 6:
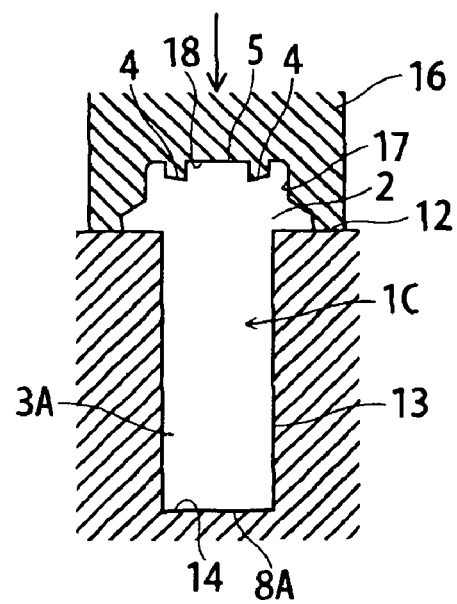

In Process 2, as shown in FIG. 6, said green bolt head 2B of said preliminary forged body 1B is punched from the upper side with a punch 16 which is used for the main forging to form a bolt head 2.

Said punch 16 which is used for the main forging has a cavity 17 having a shape corresponding to the polygonal (hexagonal) shape of said bolt head 2, and a bolt head upper face molding part 18, to form a recess 4 and a projection 5 on the upper face of said bolt head 2, said bolt head upper face molding part 18 being formed on the upper face of said cavity 17, so that a recess 4 is formed on the upper face of said bolt head 2 and a projection 5 having a plane upper face 6 is formed on the inner part of said recess 4 to form a green bolt IC.

As described above, the material of said green bolt head 2B flows radially toward the outside when said recess 4 is formed on said green bolt head 2B by punching, to give a good and accurate angular shape to the polygonal shaped outline of said bolt head 2.

Process 3 (Rolling Process)

Figure 7:
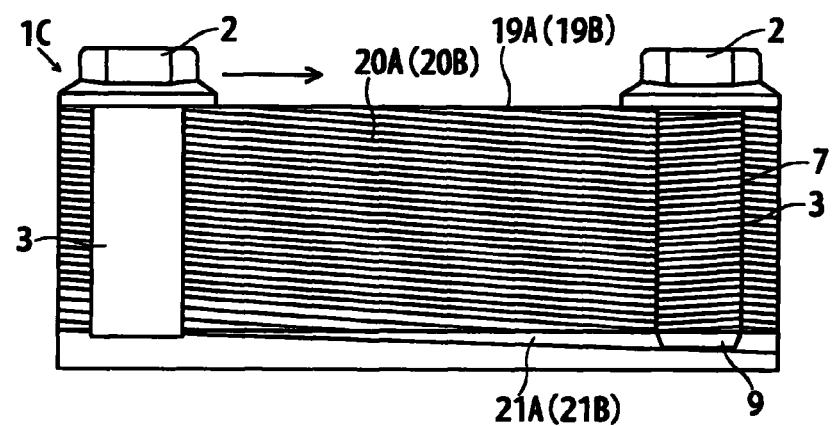

In Process 3, as shown in FIG. 7, a pair of the rolling dies 19A and 19B are used. Said rolling dies 19A and 19B each have thread rolling parts 20A and 20B, and C-face forming parts 21A and 21B.

Figure 8:
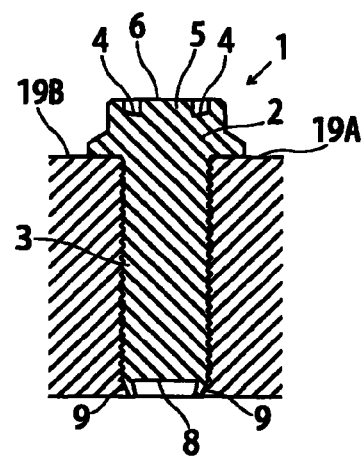
Figure 9:
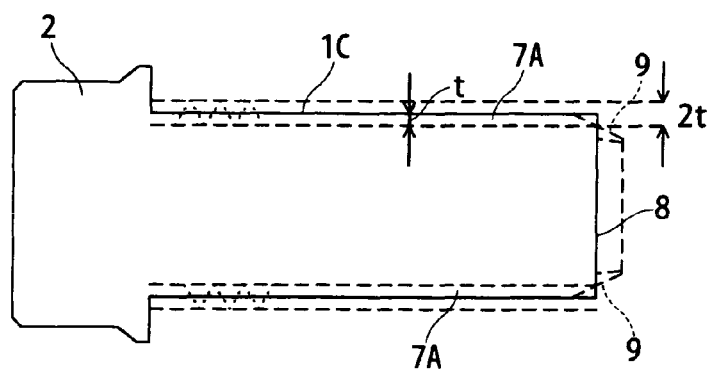

As shown in FIG. 8, said green bolt IC is set between said rolling dies 19A and 19B so that when said green bolt IC is rolled between said rolling dies 19A and 19B in the direction shown by the arrow in FIG. 7, a spiral thread is formed around said green bolt shaft 3A by said thread rolling parts 20A and 20B, with a wall 9, the outside face of which is C-face part 9 being formed at the end part of said green bolt shaft 3A by said C-face forming parts 21A and 21B. In said rolling process, the thread forming part 7A which is on the outside of said green bolt shaft 3A is stretched from the end of said green bolt shaft 3A to be said wall 9 having said C-face part.

As described above, said wall 9 having said C-face part is formed by stretching said thread forming part 7A which is on the outside of said green bolt shaft 3A, and in said rolling process, said plane end face part 8 at the end of said green bolt shaft 3A maintains a maximum area after the rolling process to guarantee a highly accurate axial force measurement.

The thickness t of said thread forming part 7A of said green bolt shaft 3A is set to be a little greater than the height of the thread.

The aforementioned embodiment should not limit the scope of the present invention. For example, besides said embodiment, the polygonal shaped outline of said bolt head may be of any polygonal shapes ranging from hexagonal to dodecagonal, and each corner of the polygonal shaped outline of said bolt head may also be rounded to extend the life of said die.

Further, said flange part 10 formed at the root end of said bolt head 2 can be omitted, and if necessary, a washer may be set at the root end of said bolt head.

POSSIBILITY OF INDUSTRIAL USE

Said bolt of the present invention is manufactured in a shortened process, since its thread and C-face part are formed together in a rolling process, so that said bolt has a good productivity. Further, since a wide plane end face at the end of the bolt shaft is secured and any size of the probe of the axial force detector can be applied, the present invention can be used industrially.

EXPLANATION OF NUMBERS

| | |
|---|---|
| 1. | bolt |
| 1A | bolt material |
| 1B | preliminary forged body |
| 1C | green bolt |
| 2 | bolt head |
| 2A | bolt head forming part |
| 2B | green bolt head |
| 2C | (bolt head) corner |
| 3 | shaft |
| 3A | shaft forming part |
| 4 | recess |
| 4C | (recess) corner |
| 5 | projection |
| 6 | plane (upper) face |
| 7 | thread |
| 7A | thread forming part |
| 8(8A) | plane (end) face |
| 9 | wall, the outside face of which being C face part |
| 10 | flange |
| 11 | bottom of recess |
| 12 | (cold forging machine) die |
| 13 | cylindrical cavity |
| 14 | plane (end) face molding part |
| 15 | punch used for preliminary forging |
| 16 | punch used for main forging |
| 17 | cavity (for bolt head) |
| 18 | bolt head upper face molding part |
| 19A, 19B | rolling die |
| 20A, 20B | thread rolling part |
| 21A, 21B | C-face forming part |

The invention claimed is:

1. A bolt, the axial force of which is to be determined by a supersonic wave, consisting of a bolt head having a polygonal shaped outline, and a bolt shaft around which a spiral thread is formed, wherein a recess having a polygonal shaped outline corresponding to the polygonal shaped outline of said bolt head is formed on said bolt head, with each corner of the polygonal shaped outline of said recess and each corresponding corner of the polygonal shaped outline of said bolt head being on a radial line from the center of said recess, with a projection having a plane upper face being formed on the inner side of said recess, said plane upper face being set to be on the same level as, or a little higher level than, the upper face of said bolt head, said bolt shaft having a plane end face, said plane end face being surrounded with a wall, the outer diameter of which is set to reduce gradually toward the end of said bolt shaft, said wall being formed during the thread rolling process by stretching the outside of the bolt shaft in which the spiral thread is formed.

2. A bolt in accordance with claim 1, wherein the diameter of the plane upper face of said projection formed on the inner side of said recess is set to be in the range of between 1/5 and 4/5 of the distance between one and the other side of the polygonal shaped outline of said recess in opposition to each other, with said wall of said bolt shaft end having an outside face set to incline at an angle α in the range of between 30 and 70 degrees.

* * * * *